No. 722,181. PATENTED MAR. 3, 1903.
D. N. LONG.
ACETYLENE GAS GENERATOR.
APPLICATION FILED AUG. 25, 1900.
NO MODEL.
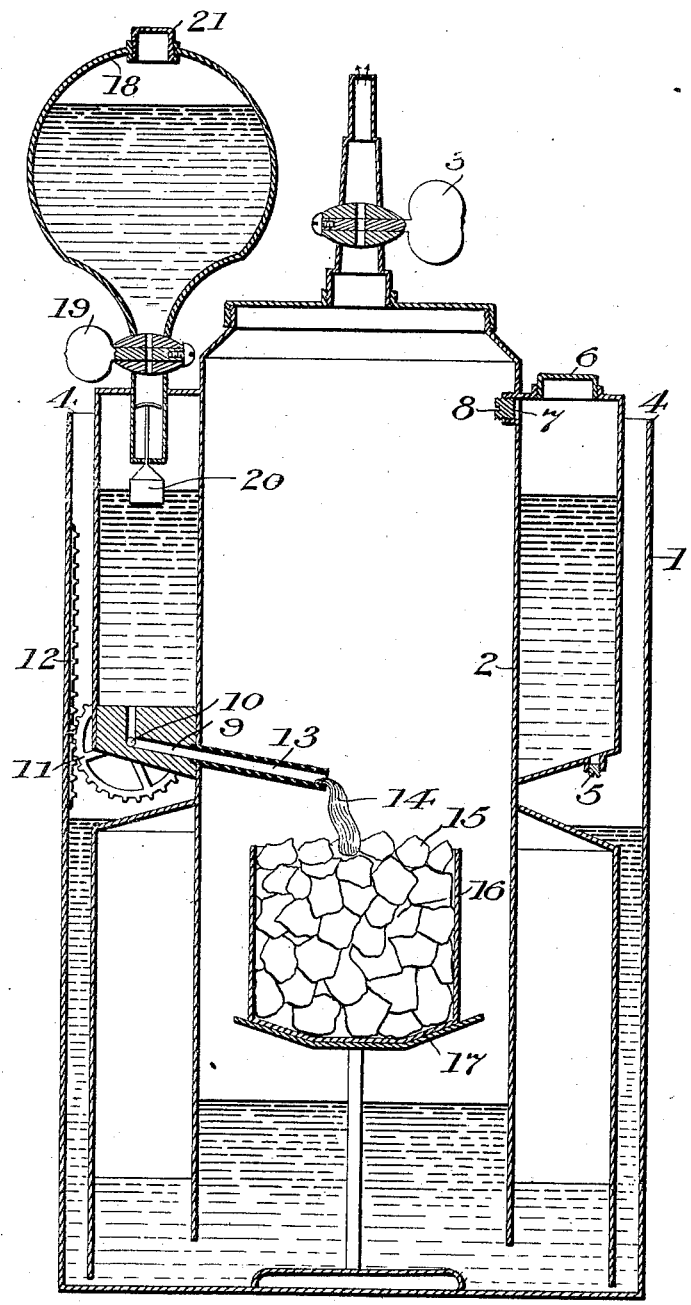

UNITED STATES PATENT OFFICE.

DAVID N. LONG, OF BUFFALO, NEW YORK, ASSIGNOR, BY MESNE ASSIGNMENTS, TO J. B. COLT COMPANY, A CORPORATION OF NEW JERSEY.

ACETYLENE-GAS GENERATOR.

SPECIFICATION forming part of Letters Patent No. 722,181, dated March 3, 1903.

Original application filed January 16, 1896, Serial No. 575,711. Divided and this application filed August 25, 1900. Serial No. 28,068. (No model.)

*To all whom it may concern:*

Be it known that I, DAVID N. LONG, a citizen of the United States, residing at Buffalo, in the county of Erie and State of New York, have invented a new and useful Gas-Generator, of which the following is a specification.

My invention relates to an improved construction and arrangement of parts of an apparatus for generating gas, particularly acetylene gas, which is generated by the combination of water and a solid substance like calcium carbid, whereby the working pressure of said gas is regulated by the weight of water in the water-reservoir, the feeding of said water to said carbid is regulated and controlled automatically by said gas-pressure, a substantially uniform gas-pressure may be maintained, and a convenient vent for the escape of excess gas is provided through the same pipe that supplies the water, all as will be hereinafter more fully described and claimed.

The accompanying drawing represents a central vertical section through a generator embodying my said invention, on which the various parts are indicated by appropriate reference-numerals.

1 is an inclosing tank for the generator cylinder or chamber 2, which is provided with a closed top with a gas-outlet controlled by a valve 3. The lower end of said chamber is open and surrounded by an air-chamber and immersed in a water seal in the lower portion of the tank 1. Partly or wholly surrounding the upper portion of chamber 2 is the water tank or reservoir 4, formed, preferably, by a second wall at a suitable distance from said chamber, with an appropriate bottom connected to said chamber at a point about midway its height and above the carbid-holder within chamber 2. By this arrangement the upper as well as the lower end of said chamber is partly or wholly surrounded by a water-jacket, which absorbs heat therefrom and prevents an excessive high temperature being caused within by the generation of the gas. The water-reservoir may of course be arranged separately; but I prefer the arrangement shown for the reasons stated. In the bottom of said reservoir 4 is a drainplug 5 for the purpose of drawing off any sediment or draining the reservoir, and at the top is an opening provided with a cap 6, through which the chamber may be filled. During the ordinary operation of the apparatus this opening is left open, but when any unusual pressure of gas is desired it is closed, as will be presently more fully described. Near the top of said reservoir is also provided an opening 7, communicating with the interior of chamber 2, having a plug 8, by which it is kept closed under ordinary conditions. At a suitable point on one side at the bottom of the reservoir 4 a small passage-way or channel 9 is formed, preferably in a block appropriately located for the purpose, as shown, and leading from the interior of said reservoir to the interior of the chamber 2 to establish a communication between them. A valve 10 is located in said channel, by which it may be closed or restricted when desired. I have shown a pinion 11 on the stem of said valve, which is adapted to mesh with a rack 12 on the side of tank 1, and thus operate said valve automatically upon the rise and fall of chamber 2 whenever the pressure therein is sufficient to produce such result. It will be seen, however, that the gas-pressure in the generating-chamber must be sufficient to overcome the weight of said chamber and the load carried thereby, including the water-reservoir and contents, before this operation can occur. Therefore it can take place only under extraordinary conditions, as the gas will escape through the vent provided by the passage-way between the reservoir and chamber and out through said reservoir under any ordinary pressure and during any usual operation as soon as the pressure exceeds somewhat the pressure of the water in said passage-way. Said passage-way is therefore under ordinary conditions for all practical purposes a free and open passage-way for the water from the reservoir to the generating-chamber and a free and open vent for the gas from said chamber to said reservoir when its pressure exceeds sufficiently the pressure of the water in said passage-way. The location of said passage-way above the carbid or the lowest portion of said carbid, and its form, which is without any upward incline in the direction of the flow of the water from the reservoir to the chamber, aid materially in securing the result sought, as because of this form and arrangement the gas may escape through this vent as soon as its pressure exceeds the pressure of the water slightly, inasmuch as when the gas-pressure is slightly in excess of that of the head of water it begins to force the water back, and in doing so diminishes such head if the passage-way be inclined downward, or said head remains constant if it be horizontal. It results that as soon as the gas-pressure begins to force the water back it will continue to do so until the water is forced back out of the passage-way and the gas escapes up through the water until the pressure is diminished to the point where the pressure of the water head will overcome it, when the water will again be fed through said passage-way to the carbid. Thus the pressure of the gas acts against the pressure of the water in this passage-way, the operation of the apparatus is automatically regulated, and the pressure of the gas in the chamber maintained substantially the same at all times during the use of the apparatus, with the consequent well-known advantages. To the inner end of channel 9 is connected a flexible tube 13 of sufficient length to reach to a point above the carbid 15, and to the inner end of said tube 14 I preferably attach a wick or such like material, which extends down upon said carbid and is adapted to conduct the water thereto by capillary action instead of permitting it to pass in drops, whereby more satisfactory results are secured. By having tube 13 flexible it can be bent aside to accommodate large pieces of carbid.

The carbid 15 is held in a suitable holder 16, mounted on a support 17 (or may be placed on said support itself) in the lower portion of the chamber 2, said support resting on the bottom of tank 1.

On the top of reservoir 4 is preferably mounted a water-supply tank 18, communicating therewith by a suitable tube, in which is mounted a controlling-valve 19. Said tank contains the supply from which reservoir 4 is replenished as the water is used therefrom, a valve in the passage between tank 18 and reservoir 4 connected to a float 20 being adapted to regulate the supply automatically to maintain a substantially uniform water-level in said reservoir 4 at all times and a consequent uniform water-pressure at channel 9, as will be readily understood.

In operation the apparatus being charged with the supply of calcium carbid and water, as shown, the valves 10 and 19 are opened and the cap 6 removed to open reservoir 4 to the outside air. The water passing through the restricted passage 9 filters through the wick 14 onto the carbid in small quantities, and combining therewith at once generates gas of the character described. The process of generation continues until the chamber 2 is filled to such a degree that the pressure of gas therein equals or slightly overbalances the water-pressure in reservoir 4 at the outlet-passage 9, when said pressure will stop the further flow of water onto the carbid and the further generation of the gas after the water contained in the wick has been absorbed. The channel or passage 9, as before stated, is made of a small diameter, its size being less than that required for the passage of both gas and water therethrough in opposite directions simultaneously. By this arrangement when the pressure of gas in chamber 2 exceeds that of the water in reservoir 4 sufficiently the water in passage-way 9 will be held back and forced upward to permit the gas under such pressure to escape into reservoir 4, and thence through the water therein to the top thereof and out through the opening from which cap 6 has been removed.

The slight incline at the lower portion of the passage-way 9 and the small size of said passage-way makes necessary only a slight excess of gas-pressure over the water-pressure at this point to force back said water and permit the passage-way to serve as a vent for the escape of the excess gas, and the apparatus can thus be adjusted to respond quickly to any change in pressure, and a substantially uniform pressure is thus secured, the float-valve 20 being set so as to maintain in the reservoir the quantity of water required to balance the desired pressure of gas.

In the event of an excessive pressure being desired the cap 6 can be closed, when the pressure will increase until it is sufficient to overcome the weight of the chamber 2 and the parts carried thereby, when said chamber may rise sufficiently, so that the pinion 11, operated by the rack 12, will close the valve 10 and shut off the water-supply. In either method of use as soon as the gas-pressure falls off sufficiently of course the water will again be fed to the carbid and the process of generation will be resumed.

If a greater volume of gas is desired than can be made by the water passing through the way 9, the end of tube 13 can be closed by a plug or the valve 10 closed to shut off the flow at this point. The plug 8 is removed and also the float-valve 20. The water is thus allowed to freely pass from tank 18 to reservoir 4 until the level of the opening 7 is reached, when the water will flow into chamber 2 onto the carbid (sufficient head of water being provided) through said opening in a larger quantity. The gas will thus be more rapidly generated, and when the pressure becomes excessive it will operate to force down the water in said reservoir, expelling it into tank 18 until the level of the lower end of the pipe connecting the tank 18 and reservoir 4 is reached, when the gas can escape through said tank, the cap 21 being removed from the opening in its top when in operation, as will be readily understood.

By having the bottom of the water-reservoir at or above the level of the carbid-holder and the water-passage in the lower portion of said reservoir the water can be used therefrom until exhausted, if necessary. The hollow chambers around the lower end of the generating-chamber serve to form air-cushions when the parts are immersed in the water seal, thus affording a buoyancy to the chamber, which may be of advantage at times. By this arrangement a vent for the excess gas is provided through the water-chamber and through the passage-way through which the water is fed therefrom to the carbid, and the feed of said water is or may be entirely regulated by the gas-pressure, and vice versa, the gas-pressure regulated by the water-pressure at said passage-way, and a very perfectly operating and evenly-balanced apparatus and one that is simple and inexpensive in construction is provided.

Having thus fully described my said invention, what I claim as new, and desire to secure by Letters Patent, is—

1. In an acetylene-gas generator, the combination, of the generating-chamber for containing the carbid, the water-reservoir with a vent in its upper portion, said reservoir and chamber being connected by a passage-way of a size restricted to prevent the passage of water and gas therein in opposite directions simultaneously, which passage-way is open and free at all times when the parts of the apparatus are in their normal operative positions in relation to each other, whereby the pressure of the gas and water are directly opposed to each other in operation and said passage-way will serve as a vent for the gas when its pressure exceeds that of the head of water and for the water when its head exceeds the pressure of the gas, and the two pressures thus remain substantially automatically balanced at all times.

2. In an acetylene-gas generator, the combination of the generating-chamber and water-reservoir connected by a passage-way terminating within said chamber in a flexible conductor.

3. In an acetylene-gas generator, the combination, of the generating-chamber, the water-reservoir communicating therewith through a passage-way, a conductor on the inner end of said passage-way, and a wick running from the end of said conductor to said carbid, substantially as set forth.

4. In an acetylene-gas generator, the combination, of the generating-chamber containing the carbid, the water-reservoir communicating therewith by a passage-way, a valve in said passage-way, another communicating passage-way near the top of said reservoir, means for opening and closing the same, the supply-tank above said reservoir, and a valve for controlling the communication between said tank and reservoir, substantially as set forth.

5. The combination in an acetylene-gas generator, of the outside tank containing water for a seal, the generating-chamber formed with hollow walls open at their lower ends mounted in said tank and sealed in said water, air-cushions being thus formed by said hollow walls, the water-reservoir on the upper portion of said chamber communicating therewith through a passage-way, and the carbid-holder containing the carbid in the lower portion of said chamber, substantially as set forth.

6. In an acetylene-gas generator, the combination, of the generating-chamber for containing the carbid, the water-reservoir with a vent-opening in its upper portion, said reservoir and chamber being connected by a passage-way of a size restricted to prevent the simultaneous passage of gas and water therein in opposite directions and located with all its parts substantially at or below the level at which it communicates with the water-reservoir, and being open and without obstruction at all times when the parts of the machine are in their normal operative positions, substantially as set forth.

7. In an acetylene-gas generator, the combination, of the generating-chamber for containing the carbid, the water-reservoir having a vent-opening in its upper portion, said chamber and reservoir being connected by a passage-way of constant opening when the parts are in normal position, which passage-way is of a size restricted to prevent the simultaneous passage of gas and water therethrough in opposite directions and is without any material or substantial upward inclination in the direction of the flow of the water to the generator, substantially as set forth.

8. In an acetylene-gas generator, the combination of the generating-chamber, the water-reservoir having a vent for gas, a restricted passage-way having no material or substantial upward incline in the direction of the flow of water, leading from the reservoir to the chamber, situated above the level of the carbid and providing a vent for the gas from such chamber into said reservoir only when its pressure exceeds that of the water, and a wick for conducting the water from said passage-way to the carbid, substantially as set forth.

9. In an acetylene-gas generator, the combination of a generating-chamber for containing the carbid, a water-reservoir with an opening in its upper portion, a passage-way of such size as to prevent the simultaneous passage therethrough of gas and water in opposite directions, which passage-way is open and free at all times when the parts of the apparatus are in their normal operative positions in relation to each other to conduct water from said reservoir into said chamber situated at a higher level than a portion of the carbid and adapted to supply a practically constant head of water whereby a substantially uniform water-pressure at its outlet equal to the desired gas-pressure is maintained, and forming an escape-vent for gas from said chamber only when the pressure of gas exceeds the force of the head of water, substantially as set forth.

10. In an acetylene-gas generator, the combination, of the generating-chamber for containing the carbid, the water-reservoir with an escape-opening for gas in its upper portion, said reservoir and chamber being connected by a passage-way of a size restricted to prevent the passage of water and gas therein in opposite directions simultaneously, which passage-way is open and free at all times when the parts of the apparatus are in their normal operative positions in relation to each other, and which shall have a water-pressure at its outlet equal to the desired gas-pressure in the chamber, and which serves as an escape-vent for the gas when it exceeds such pressure, substantially as set forth.

11. In an acetylene-gas generator, the combination, of the generating-chamber for containing the carbid, the water-reservoir with an escape-opening for gas in its upper portion, said reservoir and chamber being connected by a passage-way of a size restricted to prevent the passage of water and gas therein in opposite directions simultaneously, which shall have a water-pressure at its outlet equal to the desired gas-pressure in the chamber, and which serves as an escape-vent for the gas when it exceeds such pressure, and a wick for conducting the water from said passage-way to the carbid, substantially as set forth.

DAVID N. LONG.

Witnesses:
M. A. GROFF,
H. Y. HENNING.